(12) United States Patent
Tsukashima et al.

(10) Patent No.: US 7,615,975 B2
(45) Date of Patent: Nov. 10, 2009

(54) MOTOR MODULE HAVING A DEFORMABLE COMPONENT THAT ABSORBS TOLERANCES

(75) Inventors: Hiroyuki Tsukashima, Toyota (JP); Takamasa Takeuchi, Anjo (JP); Kazumoto Konda, Yokkaichi (JP); Sho Miyazaki, Yokkaichi (JP)

(73) Assignees: Toyota Jidosha Kabushiki Kaisha, Toyota (JP); Aisin AW Co., Ltd., Anjo (JP); Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 435 days.

(21) Appl. No.: 10/575,531

(22) PCT Filed: Feb. 10, 2005

(86) PCT No.: PCT/JP2005/002526

§ 371 (c)(1),
(2), (4) Date: Apr. 10, 2006

(87) PCT Pub. No.: WO2005/078902

PCT Pub. Date: Aug. 25, 2005

(65) Prior Publication Data

US 2007/0296290 A1    Dec. 27, 2007

(51) Int. Cl.
*G05F 1/00* (2006.01)
(52) U.S. Cl. ............................ 323/272; 310/42; 310/46; 310/71; 310/261
(58) Field of Classification Search .................. 323/272; 310/71, 40 R, 42, 43, 46, 261
See application file for complete search history.

(56) References Cited

U.S. PATENT DOCUMENTS

| 5,465,016 | A   | * | 11/1995 | Mancl et al. | .................. 310/71 |
| 2002/0047363 | A1 | * | 4/2002 | Kloeppel et al. | .............. 310/71 |
| 2002/0050752 | A1 | * | 5/2002 | Katsuzawa et al. | ............ 310/71 |
| 2003/0024749 | A1 | * | 2/2003 | Kobayashi et al. | ......... 180/65.2 |
| 2004/0201296 | A1 | * | 10/2004 | Hama et al. | ................... 310/71 |

FOREIGN PATENT DOCUMENTS

| JP | A 60-156236 | 8/1985 |
| JP | U 5-2562 | 1/1993 |

(Continued)

*Primary Examiner*—Edward Tso
*Assistant Examiner*—Arun Williams
(74) *Attorney, Agent, or Firm*—Oliff & Berridge, PLC (57) ABSTRACT

A cable for supplying electric power to a motor is electrically connected to an inner conductor of a terminal block via a contact by a mating structure of a male connector and a female connector. A connecting member for electrically connecting the inner conductor and a motor winding includes a fixed terminal and a movable terminal. The fixed terminal is electrically connected to the inner conductor by a fixing member and has a portion formed to extend along a terminal at the tip of the motor winding. The movable terminal is elastically deformable in accordance with the position of the terminal and arranged to hold the terminal interposed between itself and the fixed terminal. As a result, a motor module can be assembled to the terminal block integrally formed with a housing, while component tolerance is effectively absorbed by the connecting member.

8 Claims, 8 Drawing Sheets

FOREIGN PATENT DOCUMENTS

| | | |
|---|---|---|
| JP | U 5-18258 | 3/1993 |
| JP | A 09-200991 | 7/1997 |
| JP | A 10-112958 | 4/1998 |
| JP | A 11-18392 | 1/1999 |
| JP | A 2002-204549 | 7/2002 |
| JP | A 2003-189532 | 7/2003 |

* cited by examiner

MOTOR ROTATION SHAFT DIRECTION

MOTOR MODULE HAVING A DEFORMABLE COMPONENT THAT ABSORBS TOLERANCES

TECHNICAL FIELD

The present invention relates to a motor module, and more specifically, to a motor module that is stored in a housing (case) and assembled to a terminal block (terminal base) integrally structured with the housing.

BACKGROUND ART

A generally employed structure of an on-board motor module is the one storing and fixing the module in a housing, so that resistance to vibration or shock is improved.

As one example of such a structure, Japanese Patent Laying-Open No. 9-200991 discloses a technique in which a motor winding is connected by means of welding to a terminal block mounted at a terminal end integrally with a housing and the connected portion is molded, so that resistance to vibration or shock is improved.

In order to connect a motor module to a terminal block, a mechanism for absorbing an error within a tolerance related to size, plumbness, mounting position and the like of each component of the terminal block or the motor module (hereinafter referred to as "component tolerance") is required. In general, the component tolerance can be absorbed by connecting a longer motor winding to allow slack.

However, when the motor module is mounted in a narrow space, as the distance between the stator of the motor module and a terminal block is small, the degree of freedom of the motor winding is small and it is difficult to absorb the component tolerance by the motor winding.

If the motor module is connected to the terminal block in a state where the component tolerance is not fully absorbed, a stress may be applied to the motor winding of which insulation has been ensured by the varnish treatment, and a failure such as loss of the ensured insulation may be caused. On the other hand, if each component tolerance is just strictly set in order to better assemble the motor module to the terminal block, the costs may be increased.

DISCLOSURE OF THE INVENTION

An object of the present invention is to provide a structure that can effectively absorb the component tolerance in a motor module assembled to a terminal block integrally structured with a housing.

A motor module according to the present invention is stored in a housing, and includes a motor winding and a terminal block. The motor winding has at its tip a terminal formed to extend in a prescribed direction. The terminal block is provided integrally with the housing and configured to electrically connect the motor winding to an external wiring for supplying electric power to the motor module. The terminal block includes a first contact for electrically connecting an internal conductor and the external wiring, and a second contact for electrically connecting the internal conductor and the motor winding, wherein the second contact has a structure that is elastically deformable in accordance with a position of the terminal of the motor winding.

The motor module according to the present invention has a structure that is elastically deformable in accordance with the position of the terminal of the motor winding, at the second contact for electrically connecting the internal conductor electrically connected to the external wiring to the motor winding, and therefore the motor winding can be connected to the terminal block, while absorbing component tolerance. Accordingly, the motor module can be assembled to the terminal block provided integrally with the housing, while absorbing each component tolerance.

Preferably, in the motor module of the present invention, the second contact includes a fixed terminal and a movable terminal. The fixed terminal has a portion formed to extend along an extending direction of the terminal of the motor winding, the portion being electrically connected to the internal conductor. The movable terminal is arranged so as to hold the terminal of the motor winding between the fixed terminal, and it is elastically deformable in accordance with the position of the terminal.

According to the motor module above, the terminal of the motor winding is held as interposed between the fixed terminal electrically connected to the internal conductor and the movable terminal that is elastically deformable in accordance with the position of the terminal of the motor winding, which are forming the second contact. Thus, the component tolerance absorbing mechanism with the second contact can be implemented, only by the addition of the movable terminal and without an increase in size.

Preferably, in the motor module of the present invention, the terminal of the motor winding has a rod-like shape. The second contact has a plurality of movable terminals arranged to form an opening smaller than a cross-sectional area of the terminal of the motor winding before the terminal is inserted, each of the plurality of movable terminals being elastically movable. After being inserted into the opening, the terminal of the motor winding is held closely with the plurality of movable terminals by pressing force of the plurality of movable terminals having been elastically moved. The plurality of movable terminals are electrically connected to the internal conductor.

In the motor module above, the structure where the rod-like terminal of the motor winding being inserted is held by the pressing force from the plurality of movable terminals that form the second contact and that are elastically movable achieves simplification of the work of connecting the motor winding to the terminal block. Additionally, component tolerance that can be absorbed is relatively great. Accordingly, the rod-like terminal may be shortened, and therefore it contributes toward making the motor module compact.

Further preferably, in the motor module of the present invention, the first contact has a structure for mating the internal conductor and the external wiring in a direction perpendicular to a motor rotation shaft direction. Further, the motor winding is attached to the second contact in the rotation shaft direction.

In the motor module above, in particular, employing the structure where the motor winding is connected to the terminal block along the motor rotation shaft direction, each component tolerance can be absorbed and the motor module can be assembled to the terminal block, even when the arrangement limitation in the direction (upper-lower direction, for example) perpendicular to the motor rotation shaft direction is demanding.

A motor module according to another configuration of the present invention is stored in a housing, and includes a motor winding and a terminal block. The motor winding has at its tip a plate-like terminal extending in a prescribed direction. The terminal block is provided integrally with the housing and configured to electrically connect the motor winding to an external wiring for supplying electric power to the motor module. The terminal block includes a first contact for electrically connecting an internal conductor and the external wiring, and a second contact for electrically connecting the internal conductor and the motor winding. The first contact has a structure for mating the internal conductor and the external wiring in a direction perpendicular to a motor rotational shaft direction, and the motor winding is attached to the second contact in the rotation shaft direction, and wherein the second contact includes a plate-like fixed terminal formed to extend along an extending direction of the terminal of the motor winding, and electrically connected to the internal conductor, and a fixing member for fastening the terminal at the tip of the motor winding and the fixed terminal.

The motor module according to another configuration of the present invention is capable of absorbing component tolerance by adjusting the position of the fixed terminal fixed to the terminal block by the fixing member, at the second contact for electrically connecting the internal conductor electrically connected to the external wiring to the motor winding. Accordingly, with the simple and small structure of the fixed terminal and the fixing member (a bolt and a nut), each component tolerance can be absorbed and the motor module can be assembled to the terminal block, even when the arrangement limitation in the direction perpendicular to the motor rotation shaft direction is demanding.

Preferably, in the motor module according to another configuration of the present invention, the fixing member is configured with a set of a bolt and a nut, and an opening that is laterally longer than a diameter of the bolt is provided to each of the terminal at the tip of the motor winding and the fixed terminal.

In the motor module above, to each of the terminal at the tip of the motor winding and fixed terminal fastened by the bolt and the nut, an opening that is laterally longer than the bolt diameter is provided, whereby the capacity of the second contact in absorbing component tolerance can be improved.

BEST MODES FOR CARRYING OUT THE INVENTION

Referring to the drawings, embodiments of the present invention will be described in detail. An identical reference character is allotted to identical or corresponding parts in the drawings, and description thereof is not repeated.

First Embodiment

Figure 1:
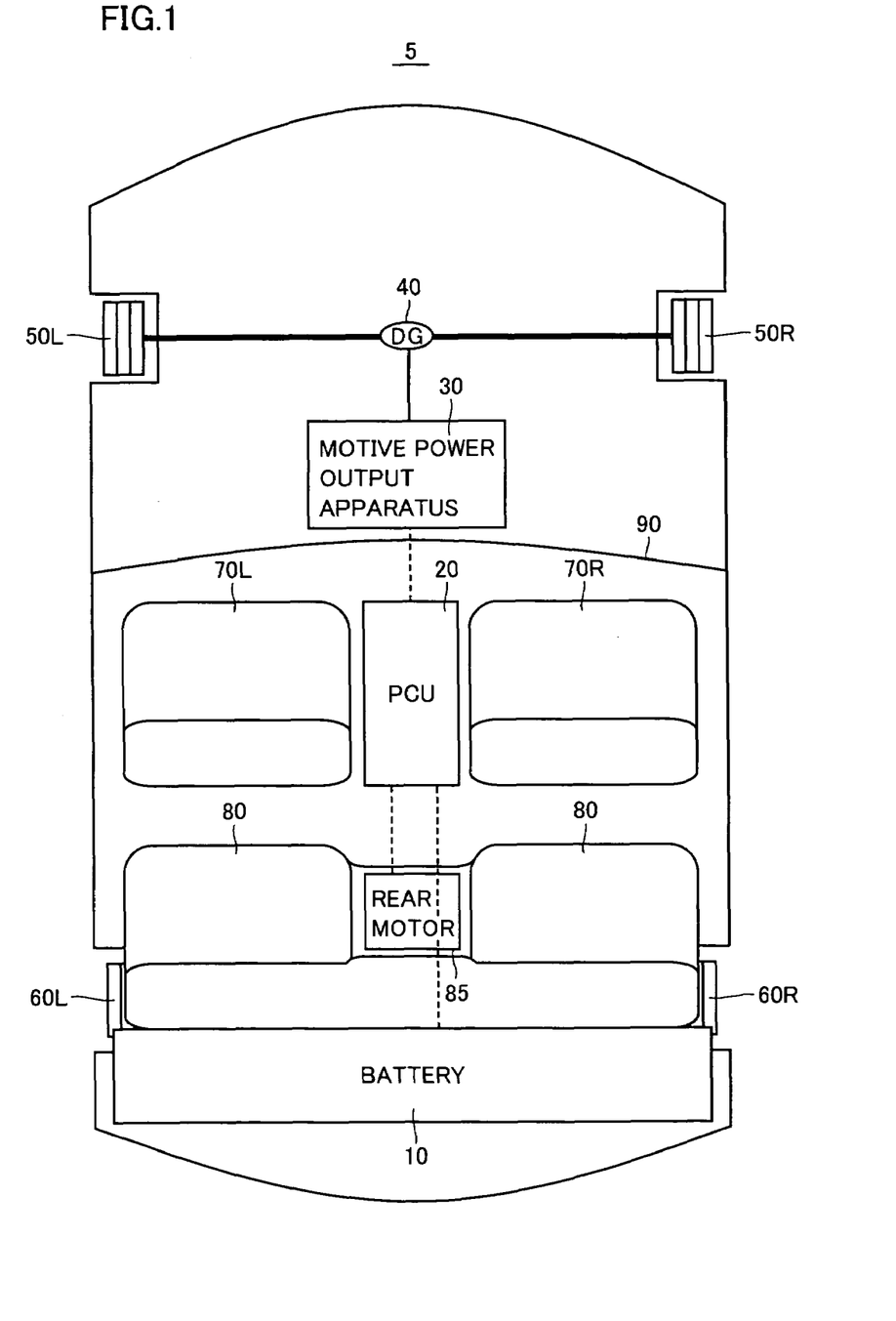
FIG. 1 is a schematic block diagram showing a configuration of a hybrid vehicle shown as an example incorporating a motor module according to the present invention.

FIG. 1 is a schematic block diagram showing a configuration of a hybrid vehicle shown as an example incorporating a motor module according to the present invention.

Referring to FIG. 1, a hybrid vehicle 5 according to the embodiment of the present invention includes a battery 10, a PCU (Power Control Unit) 20, a motive power output apparatus 30, a DG (Differential Gear) 40, front wheels 50L and 50R, rear wheels 60L and 60R, front seats 70L and 70R, a rear seat 80, and a rear motor 85.

Battery 10 is formed, for example, by a secondary battery such as a nickel-hydride metal battery or a lithium ion battery, and it supplies a direct voltage to PCU 20 and charged by a direct voltage from PCU 20. Battery 10 is arranged behind rear seat 80.

Motive power output apparatus 30 is arranged in an engine room in front of a dashboard 90, and includes an engine and a motor for driving front wheels 50L and 50R. DG 40 transmits motive power from motive power output apparatus 30 to front wheels 50L and 50R, and transmits rotational force of front wheels 50L and 50R to motive power output apparatus 30.

Thus, motive power output apparatus 30 transmits motive power from the engine and/or motor generator to front wheels 50L and 50R via DG 40, and thereby drives front wheels 50L and 50R. Additionally, motive power output apparatus 30 generates electric power by the rotational force of front wheels 50L and 50R, and supplies the generated electric power to PCU 20.

Rear motor 85 is provided for driving rear wheels 60L and 60R, and fastened to shaft for rear-wheel drive via a not-shown clutch, as needed. Fastening the clutch, what is called four-wheel-drive (4WD) running can be realized during running on an adverse-conditioned road (the road with low frictional coefficient) or during abrupt acceleration.

PCU 20 boosts a direct voltage from battery 10, and converts the boosted direct voltage to an alternating voltage to generate driving electric power of a front-wheel-drive motor and rear motor 85 in motive power output apparatus 30. Additionally, during regenerative braking operation of the front-wheel-drive motor and rear motor 85, PCU 20 converts the generated alternating voltage to a direct voltage to charge battery 10.

Figure 2:
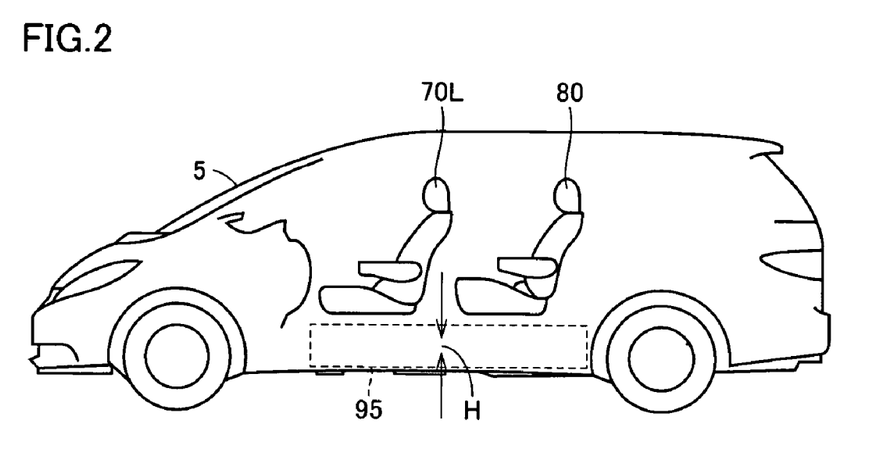
FIG. 2 is a conceptual diagram showing an arrangement area of a rear motor shown in FIG. 1.

As shown in FIG. 2, PCU 20 and rear motor 85 are provided at area 95 under the floor. Since rear motor 85 is arranged at such a limited area, its mounting space is largely limited in the arrangement in upper-lower direction H. Additionally, since it shares area 95 with PCU 20, the occupying area is required to be small also in the plane direction.

To rear motor 85, of which limitation in arrangement is demanding and the mounting space is small as described above, a motor module according to the present invention, which will be described below in detail, can be applied.

Figure 3:
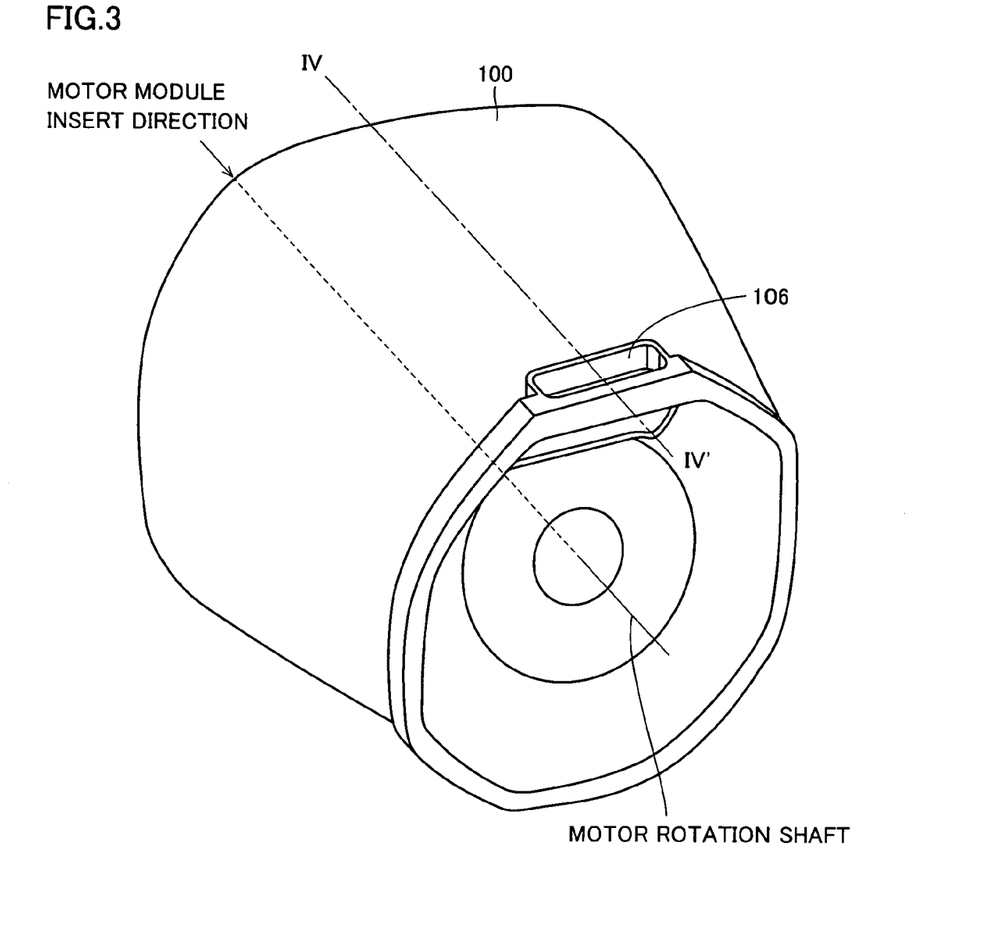
FIG. 3 is an appearance diagram showing a housing storing the motor module according to the present invention.

Referring to FIG. 3, a housing 100 accommodating the motor module (not shown) according to the embodiment includes a connector slot 106. The motor module is inserted in a direction along a motor rotation shaft with respect to housing 100 and thereby assembled.

Figure 4:
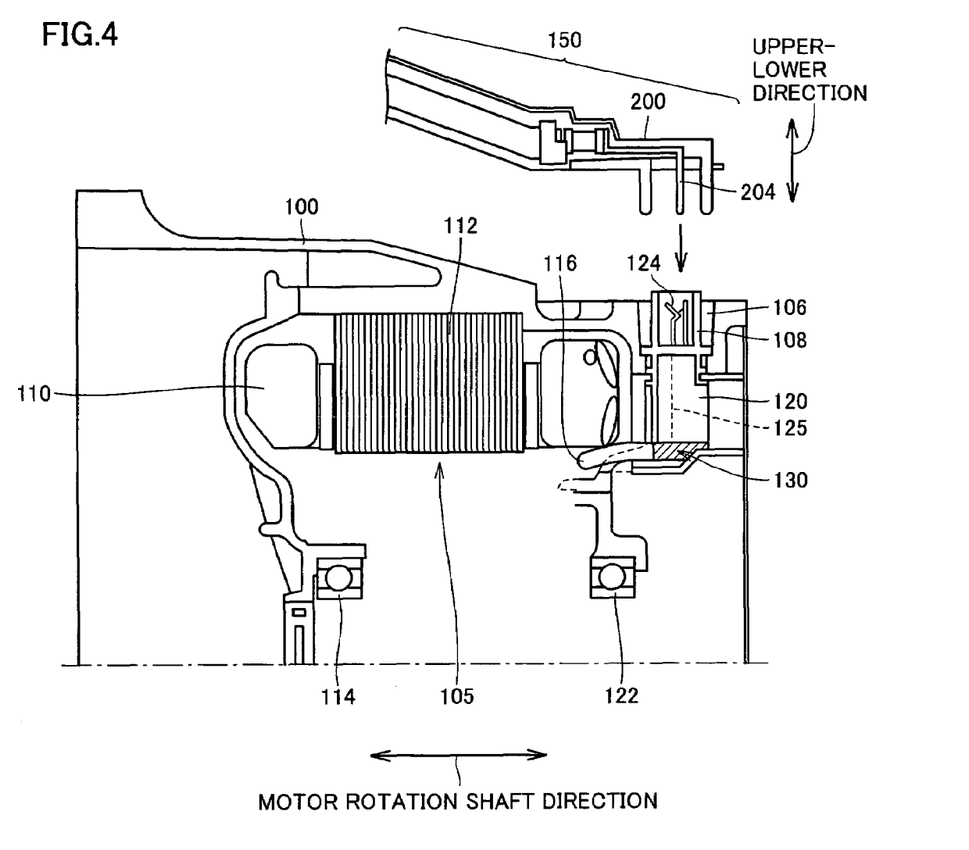
FIG. 4 shows a cross section of the motor module according to the present invention.

FIG. 4 shows a cross section of the motor module showing a cross section along IV-IV' in FIG. 3.

As shown in FIG. 4, housing 100 of the motor module according to the present embodiment accommodates a stator 105 of a rotating electric machine, bearings 114 and 122, and a terminal block 120. Stator 105 is configured by a coil 110 and a stator core 112.

To connector slot 106 of housing 100, a feed cable 150 that corresponds to an "external wiring" is attached. To an end of feed cable 150, a male connector 200 including a contact 204 is provided.

Male connector 200 is formed in a shape that conforms to housing 100 when mating. Accordingly, when male connector 200 mates with connector slot 106 side, the cable is prevented from protruding in the radial direction of the motor module or the connector is prevented from protruding from the housing. Accordingly, the mounting space of the motor module can be saved even in a narrow space. Male connector 200 attains the similar effect when formed in an L-shape also.

Terminal block 120 is provided integrally with the housing. Terminal block 120 includes a female connector 108, an internal conductor 125, a contact 124 corresponding to "a first contact" for electrically connecting feed cable 150 and internal conductor 125, and a connecting member 130 corresponding to "a second contact" for electrically connecting internal conductor 125 and motor winding 116. Inside terminal block 120, contact 124 and connecting member 130 are electrically connected via internal conductor 125.

Female connector 108 is provided corresponding to connector slot 106 so as to mate with male connector 200. Although the connector shape of male connector 200 and that of female connector 180 are not specifically limited, in the present embodiment, the male connector has a convex shape, while the female connector has a concave shape, for example.

Female connector 108 is provided with a contact 124. Contact 124 is provided so that it is brought into contact with contact 204 when female connector 108 and male connector 200 mate with each other.

Stator core 112 has a hollow cylindrical shape. Stator core 112 has a plurality of slots. Coil 110 is wrapped and fixed to the slots. Then, the stator core 112 is fastened by a bolt, for example, to housing 100 and fixed. The shaft (not shown) of the rotor of the motor module is rotatably supported by bearings 114 and 122.

Motor winding 116 of the stator is electrically connected to internal conductor 125 of the terminal block by connecting member 130. Although different reference characters are allotted to coil 110 and motor winding 116, they are electrically the same member. In other words, motor winding 116 corresponds to a lead wire for externally connecting coil 110. Accordingly, by electrically connecting motor winding 116 and feed cable 150 via terminal block 120, coil 110 of the stator is electrically supplied.

Next, referring to FIG. 5, a structure of connecting member 130 according to the embodiment of the present invention will be described in detail.

Figure 5:
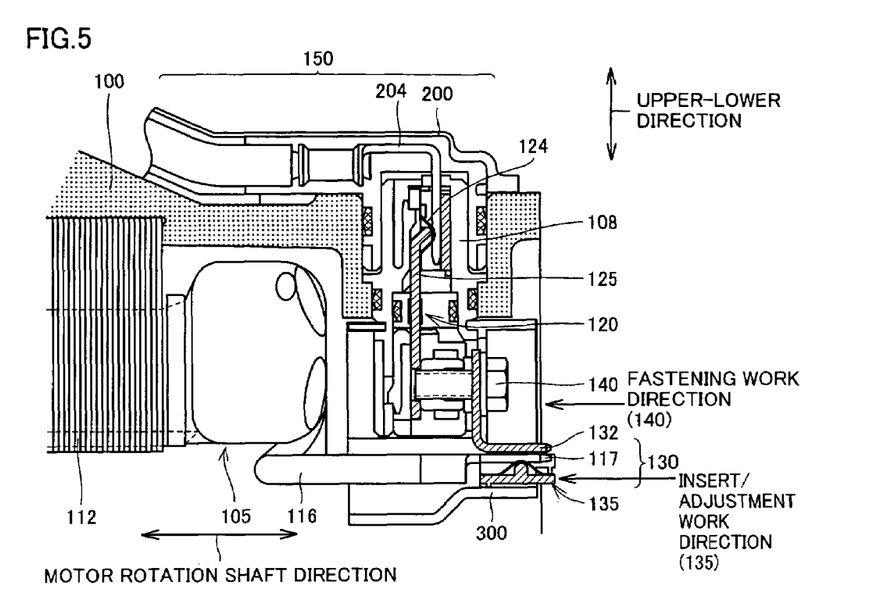
FIG. 5 describes in detail a structure of a connecting member according to a first embodiment of the present invention.

Referring to FIG. 5, to a tip of motor winding 116, a terminal 117 having an elongated shape along the insert direction of stator 105, that is, the motor rotation shaft direction, is provided.

Connecting member 130 includes a fixed terminal 132 and a movable terminal 135 structured by conductors such as metal plates. Fixed terminal 132 has portions that form L-shape. One portion extends along the extending direction of terminal 117 of motor winding 116, and the other portion is bent in upper-lower direction and electrically connected to internal conductor 125 by fixing member 140 of the conductor. Fixing member 140 is, representatively, configured by a set of metal bolt and nut.

It is noted that, even when fixed terminal 132 and movable terminal 135 are the same member, they are structured to allow for the position of terminal 117 that is varied in the motor rotation shaft direction. In such a case, the tolerance can be absorbed by forming the fastening portion that is bent to be L-shape in upper-lower direction to be a long hole.

Variable terminal 135 is provided in a clip structure, for example, in order to be elastically deformable in accordance with the position of terminal 117. As a result, even when an error is present in the position of terminal 117 due to each component tolerance, movable terminal 135 can elastically deform in accordance with such a position, and terminal 117 can be interposed between movable terminal 135 and fixed terminal 132. Thus, the component tolerance can be absorbed and terminal 117 can be electrically connected to fixed terminal 132.

Next, an assembly process of the motor module to housing 100 is described.

First, stator 105 is inserted along the motor rotation shaft direction and fixed to housing 100.

Next, terminal block 120 is inserted from above to housing 100. In this state, movable terminal 135 is inserted from the lateral direction. Fixing member 140 is fastened when the optimum alignment of terminal 117 of motor winding 116 and terminal block 120 is attained, whereby terminal block 120 is fixed integrally with housing 100. Further, by inserting stopper 300 from the motor rotation shaft direction, it prevents the terminal block from being detached. Alternatively, the housing may be fixed by a not-shown bolt or the like.

After alignment is completed and terminal block 120 is fixed to housing 100, feed cable 150 is attached to connector slot 106, and feed cable 150 and coil 110 of the stator are electrically connected. Thus, the motor module can electrically be fed.

As above, connecting member 130 is provided with the mechanism for absorbing component tolerance by movable terminal 135. Thus, by inserting the stator along the motor rotation shaft direction, the motor module can be assembled to the terminal block absorbing each component tolerance, even when the arrangement limitation in the direction (upper-lower direction in the present embodiment) perpendicular to the motor rotation shaft direction is demanding.

Further, movable terminal 135 added in order to the mechanism for absorbing component tolerance can be formed relatively small in size. Accordingly, the length in the motor rotation shaft direction can also be made compact, without increasing the motor module in size.

Still further, as it is a structure allowing movable terminal 135 to be inserted and to be aligned, and fixing member 140 to be fastened in the same direction (the direction along an arrow shown in FIG. 5), the assemble process of the motor module can be simplified.

Second Embodiment

Next, referring to FIGS. 6 and 7, the structure of the connecting member according to a second embodiment of the present invention will be described.

Figure 6:
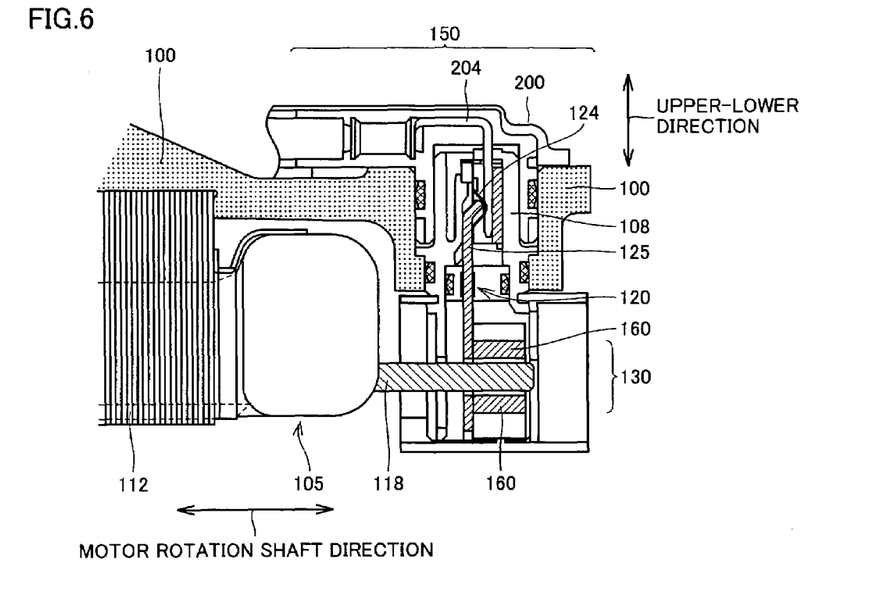
FIG. 6 is a first drawing describing in detail a structure of a connecting member according to a second embodiment of the present invention.

FIG. 6 is a cross sectional view of a motor module similar to FIGS. 4 and 5.

Referring to FIG. 6, in the second embodiment of the present invention, a rod-like terminal 118 extending along the insert direction of stator 105, that is, the motor rotation shaft direction, is provided at a tip of the motor winding. Connecting member 130 includes a spring-like terminals 160 provided in a plurality of numbers corresponding to each rod-like terminal 118. Each spring-like terminal 160 is formed to be elastically movable, by elastic deformation of a spring member (not shown) being accommodated. Further, each spring-like terminal 160 is electrically connected to internal conductor 125.

Figure 7:
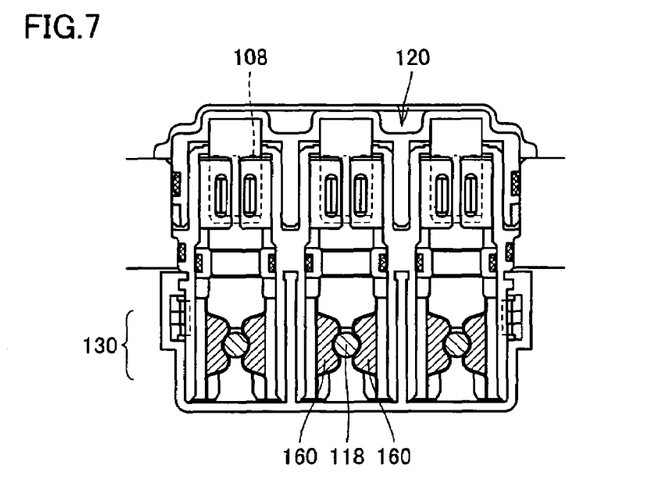
FIG. 7 is a second drawing describing in detail a structure of a connecting member according to the second embodiment of the present invention.

FIG. 7 is terminal block 120 as seen from the insert direction of stator 105.

Referring to FIG. 7, spring-like terminals 160 are arranged on the opposing sides of each rod-like terminal 118. In particular, the plurality of spring-like terminals 160 are arranged such that, before corresponding rod-like terminal 108 is inserted, an opening is smaller than the diameter (cross section) of rod-like terminal 108.

When rod-like terminal 118 is inserted, rod-like terminal 118 is closely hold as interposed between spring-like terminals 160 by the pressing force (restitution force) from spring-like terminals 160 that are elastically moved by the inserted rod-like terminal 118. Thus, rod-like terminal 118 is electrically connected to internal conductor 125 via spring-like terminal 160.

Internal conductor 125 and feed cable 150 are electrically connected in the similar structure as in the first embodiment. Accordingly, detailed description thereof is not repeated.

According to the structure of the second embodiment, component tolerance can be absorbed by elastically deformable spring-like terminals 160 and rod-like terminal 118 being in contact with each other. Thus, the motor module can be connected to the terminal block provided integrally with the housing while absorbing each component tolerance, without increasing the length in the motor rotation shaft direction.

In particular, comparing with the structure of the first embodiment, since the alignment of the movable terminal (the clip terminal) and the fastening work of the fixing member (bolt) are not required, the assembly work of the motor module can be simplified.

Further, since it is a structure where rod-like terminal 118 is held as interposed between spring-like terminals 160, the absorbable component tolerance is greater than in the structure where the movable terminal is only provided on one side. Accordingly, rod-like terminal 118 may possibly be shortened, and therefore it can contribute to reducing the size of the motor module.

Third Embodiment

Next, referring to FIGS. 8 and 9, the structure of a connection member according to a third embodiment of the present invention will be described.

Figure 8:
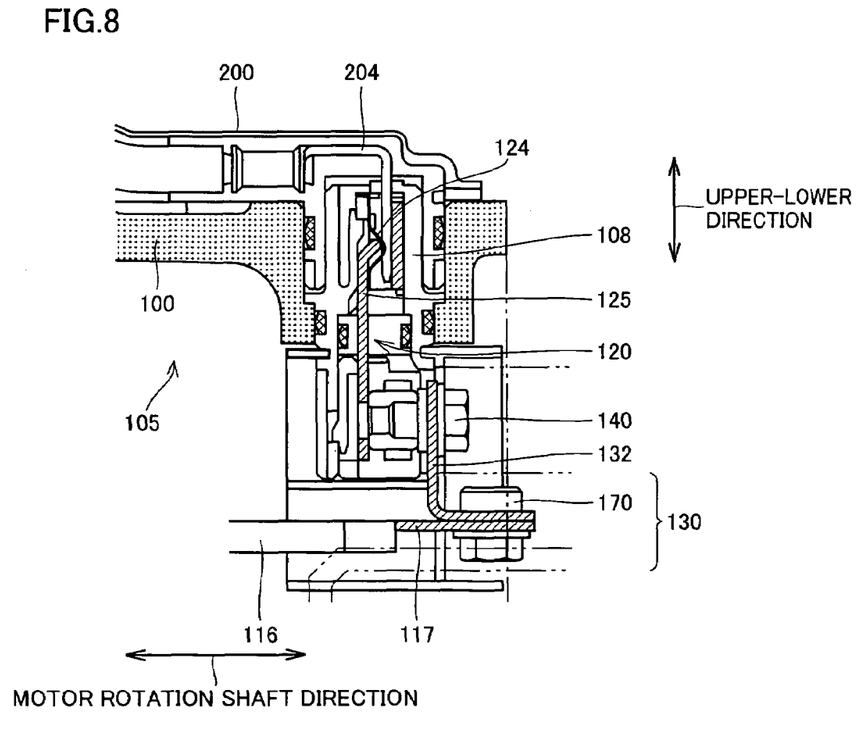
FIG. 8 describes in detail a structure of a connecting member according to a third embodiment of the present invention.

FIG. 8 is a cross-sectional view of the motor module similar to FIGS. 4 and 5.

Referring to FIG. 8, in the third embodiment of the present invention, to a tip of the motor winding, terminal 117 that is the same as in the first embodiment is provided. Connecting member 130 includes fixed terminal 132 and fixing member 170.

Fixed terminal 132 is structured as in the first embodiment, and electrically connected to internal conductor 125 by conductive fixing member 140.

Terminal 117 of the motor winding and fixed terminal 132 are fastened by fixing member 170 that is structured by a set of metal bolt and nut, representatively, and thus electrically connected.

In fastening, by adjusting the position of fixed terminal 132, each component tolerance at the position of terminal 117 can be absorbed, and the motor module can be connected to the terminal block that is provided integrally with the housing.

Figure 9:
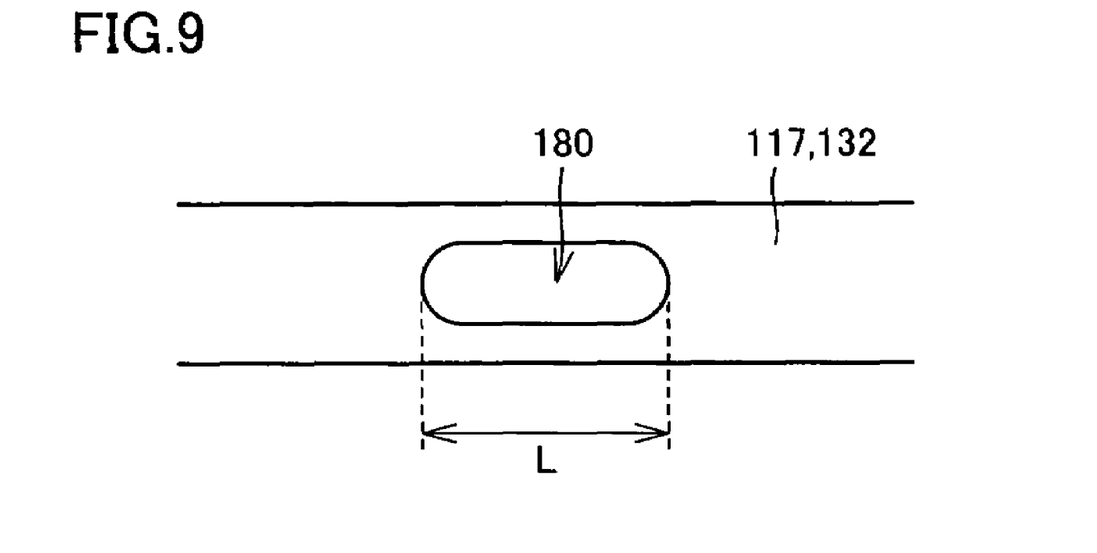
FIG. 9 describes a shape of a bolt hole provided to each of a terminal of a motor winding and a fixed terminal on a terminal block side.

It is noted that, as shown in FIG. 9, by setting the length (L) of bolt hole 180 that is "an opening" provided to each of terminal block 117 and fixed terminal 132 to be longer than the diameter of the bolt structuring fixing member 170, the capability of connecting member 130 in absorbing the component tolerance can be improved.

Thus, in the structure according to the third embodiment, by inserting the stator along the motor rotation shaft direction, the motor module can be assembled to the terminal block absorbing each component tolerance, even when the arrangement limitation in the direction (upper-lower direction in the present embodiment) perpendicular to the motor rotation shaft direction is demanding.

In particular, in the structure according to the third embodiment, as special components such as the movable terminal in the first embodiment and the spring-like terminal in the second embodiment are not necessary, it is possible to form a connecting member that can absorb component tolerance with a simple structure.

Thus, while the additional fastening work of fixing member 170 that involves adjustment for absorbing component tolerance complicates the assembly work, the connecting member can be reduced in size.

As above, in the first to third embodiments, although the examples have been described where the present invention is applied to a rear-wheel-drive motor of hybrid vehicle 5 shown in FIG. 1 as a representative example of the motor module having a limited mounting space, the application of the present invention is not limited to such a manner.

As one example, the motor module according to the present invention can be incorporated in a hybrid vehicle of FR (Front-engine Rear-Drive) type of which arrangement limitation of the motor is demanding.

Figure 10:
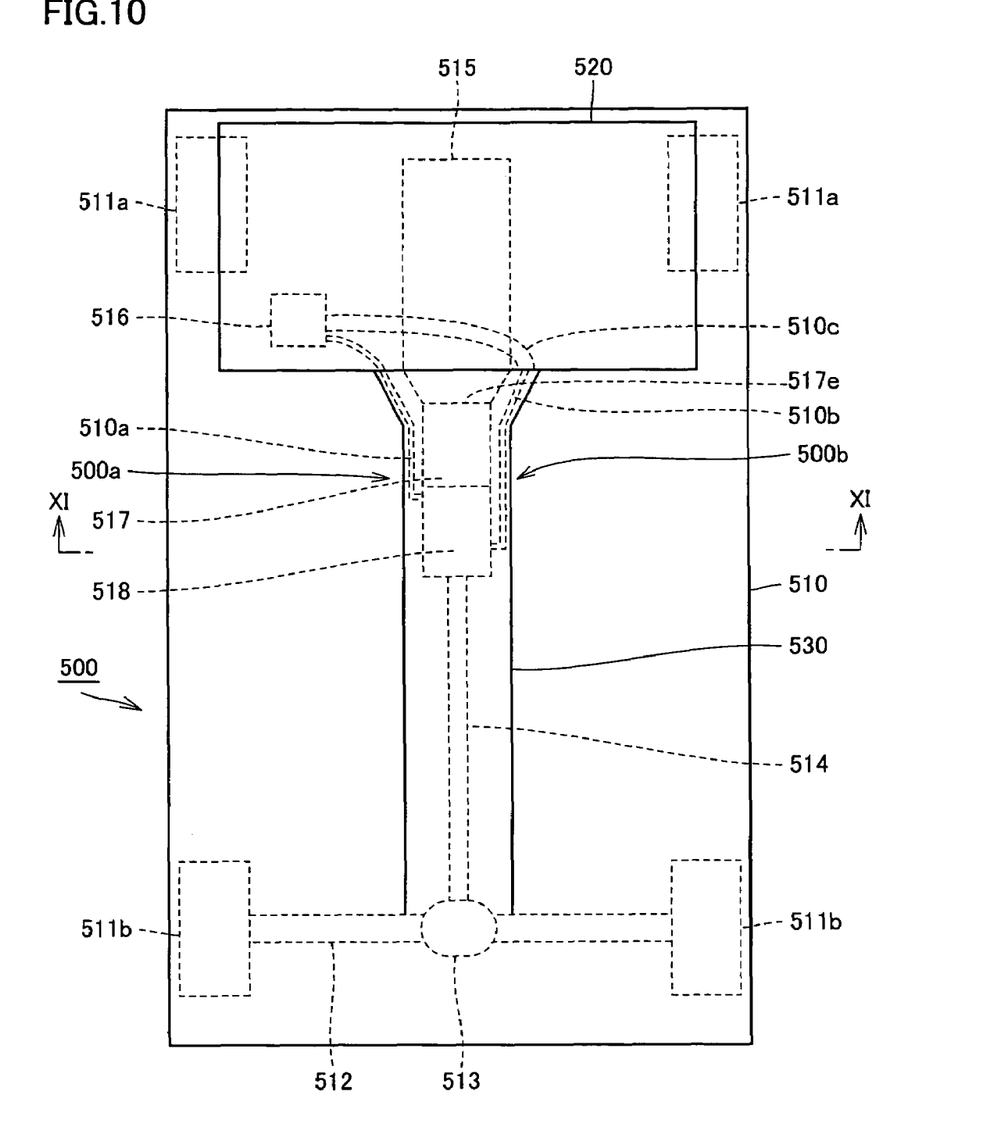
FIG. 10 is a schematic block diagram showing a configuration of an FR (Front-engine Rear-Drive) type hybrid vehicle shown as another example incorporating the motor module according to the present invention.

FIG. 10 is a schematic block diagram showing a configuration of a hybrid vehicle of FR type shown as another example incorporating the motor module according to the present invention.

Referring to FIG. 10, hybrid vehicle 500 of FR type includes a chassis 510 having an engine compartment 520 where an engine 515 is arranged and a tunnel 530 continuing to engine compartment 520, a propeller shaft 514 and electric motors 517 and 518 as a drive unit, and vehicle connectors 500a and 500b connected to electric motors 517 and 518.

Vehicle connectors 500a and 500b include bus bars 510a and 510b that extend at least from electric motors 517 and 518 to engine compartment 520 inside tunnel 530. Hybrid vehicle 500 further includes an inverter 516 provided in engine compartment 520. Bus bar 510a extends to inverter 516. Hybrid vehicle 500 further includes a flexible wire 510c that connects inverter 516 and bus bar 510b.

Vehicle connector extends to a front end 517e of electric motor 517 as a front end of the drive unit.

At the four corners of chassis 510, front wheels 511a and rear wheels 511b are attached.

Engine compartment 520 is a space positioned between front wheels 511a for accommodating engine 515. Inside engine compartment 520, not only engine 510 but also inverter 516 for supplying electric power to electric motors 517 and 518 are provided. In FIG. 10, engine 515 is arranged so that its length extends toward the traveling direction, that is, it is what is called an "length side type" engine. It is noted that the type of engine 515 is not specifically limited, and various commonly used types such as in-line engine, V engine, horizontally-opposed engine can be employed. Further, not only a gasoline engine but also a diesel engine can serve as engine 515. Additionally, an engine using other gases as its fuel may be employed.

Although inverter 516 is provided on the left side of engine 515, it is not limited thereto and it may be provided on the right side of engine 515 or coaxially to engine 515.

Tunnel 530 is provided continuously to engine compartment 520. Tunnel 530 is a space for accommodating electric motors 517 and 518 and propeller shaft 514.

Electric motors 517 and 518 are each motor/generator, and serve to alternately convert driving force and electric power. Although two electric motors 517 and 518 are provided in FIG. 10, only one electric motor may be provided. Additionally, three or more electric motors may be provided.

A transmission (a planetary for a splitter or the like) may be accommodated in tunnel 530. The transmission is arranged between electric motor 518 (M/G) and propeller shaft 514.

To electric motors 517 and 518, vehicle connectors 500a and 500b are connected. Vehicle connector 500a is connected to electric motor 517. Vehicle connector 500b is connected to electric motor 518. Vehicle connector 500a has bus bar 510a. Bus bar 510a extends from electric motor 517 to inverter 516, and connects inverter 516 and electric motor 518. Bus bar 510a is formed by a plate-like metal member, and a part thereof extends inside tunnel 530, while the rest extends inside engine compartment 520.

To electric motor 518, bus bar 510b of vehicle connector 500b is connected. Bus bar 510b extends inside tunnel 530 from electric motor 518 to engine compartment 520. Inside engine compartment 520, bus bar 510b is connected to wire 510c formed by a copper wire. Wire 510c connects inverter 516 and bus bar 510b.

The output from electric motor 518 is transmitted to rear wheels 511b via propeller shaft 514, differential gear 513 and axle 512. Although engine 515 is provided on the front side of the vehicle, the position of the engine is not limited to this portion, and it may be provided at the central portion of the vehicle.

Figure 11:
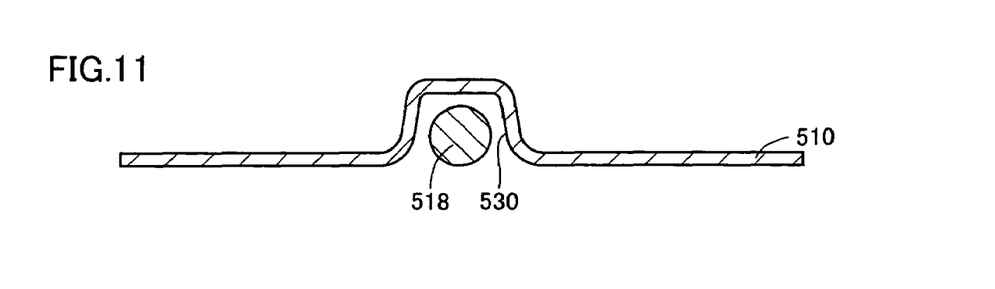
FIG. 11 is a cross sectional view along XI-XI in FIG. 10.

FIG. 11 is a cross sectional view along line XI-XI in FIG. 10. Referring to FIG. 11, the protruding portion of chassis 110 is tunnel 530. Tunnel 530 is formed in a protruding shape and thereby serves to improve strength of chassis 510. Electric motor 518 is provided inside tunnel 530. Although not shown, inside tunnel 530, a connector for supplying electric power to electric motor 518 is attached. This vehicle connector is arranged between electric motors 518 and 517 and the side wall of tunnel 530.

As above, electric motor 518 in a FR-type hybrid vehicle is provided inside tunnel 530, and the mounting space thereof is largely limited. Accordingly, the structure of the motor module according to first to third embodiments is also suitable for application to electric motor 518.

The motor module according to the present invention can be applied commonly to other motors incorporated in hybrid vehicles and to motors incorporated in other automobiles, vehicles, appliances and the like, which are configured to be fixed to a terminal block integrally provided to the motor housing and thereby electrically connected externally.

It should be understood that the embodiments disclosed herein are illustrative and non-restrictive in every respect. The scope of the present invention is defined by the terms of the claims, rather than the description and example above, and is intended to include any modifications and changes within the scope and meaning equivalent to the terms of the claims.

INDUSTRIAL APPLICABILITY

The motor module according to the present invention is applicable to a motor that is incorporated in a hybrid vehicle, an automobile, a vehicle, an appliance and the like, and that is configured to be stored in a motor housing.

The invention claimed is:

1. A motor module stored in a housing, comprising:
a motor winding having at its tip a terminal formed to extend in a prescribed direction; and
a terminal block provided integrally with said housing for electrically connecting said motor winding to an external wiring for supplying electric power to said motor module,
said terminal block including
a first contact for electrically connecting an internal conductor and said external wiring, and
a second contact for electrically connecting said internal conductor and said motor winding; wherein
said second contact has a structure that is elastically deformable in accordance with a position of said terminal of said motor winding; and
wherein the second contact is capable of absorbing a component tolerance at least due to its elastically deformable properties, and the component tolerance is related to absorbing an error due to at least one of size, plumbness and mounting position.

2. The motor module according to claim 1, wherein
said second contact includes
a fixed terminal having a portion formed to extend along an extending direction of said terminal of said motor winding, said portion being electrically connected to said internal conductor, and
a movable terminal arranged so as to hold said terminal of said motor winding between said fixed terminal, and wherein
said movable terminal is elastically deformable in accordance with a position of said terminal of said motor winding.

3. The motor module according to claim 1, wherein
said terminal of said motor winding has a rod-like shape,
said second contact has a plurality of movable terminals arranged to form an opening smaller than a cross-sectional area of said terminal of said motor winding before said terminal is inserted, each of said plurality of movable terminals being elastically movable,
after being inserted into said opening, said terminal of said motor winding is held closely with said plurality of movable terminals by pressing force of said plurality of movable terminals having been elastically moved, and
said plurality of movable terminals are electrically connected to said internal conductor.

4. The motor module according to claim 1, wherein
said first contact has a structure for mating said internal conductor and said external wiring in a direction perpendicular to a motor rotation shaft, and
said motor winding is attached to said second contact in said rotation shaft direction.

5. A motor module stored in a housing, comprising:
a motor winding having at its tip a plate-like terminal extending in a prescribed direction; and a terminal block provided integrally with said housing for electrically connecting said motor winding to an external wiring for supplying electric power to said motor module, said terminal block including a first contact for electrically connecting an internal conductor and said external wiring, and a second contact for electrically connecting said internal conductor and said motor winding; wherein said first contact has a structure for mating said internal conductor and said external wiring in a direction perpendicular to a motor rotational shaft, said motor winding is attached to said second contact in said rotation shaft direction, and wherein said second contact includes a plate-like fixed terminal formed to extend along an extending direction of said terminal of said motor winding, and electrically connected to said internal conductor, and a fixing member for fastening said terminal at the tip of said motor winding and said fixed terminal; and wherein the second contact is capable of absorbing a component tolerance at least due to having a through-hole that has a length sufficiently greater than the diameter of the fixing member to allow for translational movement within the through-hole, and the component tolerance is related to absorbing an error due to a least one of size, plumbness and mounting position.

6. The motor module according to claim 5, wherein said fixing member is configured with a set of a bolt and a nut, and an opening that is laterally longer than a diameter of said bolt is provided to each of said terminal at the tip of said motor winding and said fixed terminal.

7. The motor module according to claim 2, wherein said first contact has a structure for mating said internal conductor and said external wiring in a direction perpendicular to a motor rotation shaft, and said motor winding is attached to said second contact in said rotation shaft direction.

8. The motor module according to claim 3, wherein said first contact has a structure for mating said internal conductor and said external wiring in a direction perpendicular to a motor rotation shaft, and said motor winding is attached to said second contact in said rotation shaft direction.

* * * * *

UNITED STATES PATENT AND TRADEMARK OFFICE
CERTIFICATE OF CORRECTION

PATENT NO. : 7,615,975 B2 Page 1 of 1
APPLICATION NO. : 10/575531
DATED : November 10, 2009
INVENTOR(S) : Hiroyuki Tsukashima et al.

It is certified that error appears in the above-identified patent and that said Letters Patent is hereby corrected as shown below:

Title Page;
Please add the priority information as follows:

(30) Foreign Application Priority Data

Feb. 13, 2004   (JP)   .................... 2004-037103

Signed and Sealed this

First Day of June, 2010

David J. Kappos
*Director of the United States Patent and Trademark Office*